United States Patent
Maeda et al.

(10) Patent No.: US 11,145,866 B2
(45) Date of Patent: Oct. 12, 2021

(54) BINDER COMPOSITION FOR ALL-SOLID-STATE BATTERY, SLURRY COMPOSITION FOR ALL-SOLID-STATE BATTERY, ELECTRODE FOR ALL-SOLID-STATE BATTERY, AND ALL-SOLID-STATE BATTERY

(71) Applicant: ZEON CORPORATION, Chiyoda-ku Tokyo (JP)

(72) Inventors: Kouichirou Maeda, Tokyo (JP); Hiroki Oguro, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 344 days.

(21) Appl. No.: 16/327,431

(22) PCT Filed: Sep. 5, 2017

(86) PCT No.: PCT/JP2017/031964
§ 371 (c)(1),
(2) Date: Feb. 22, 2019

(87) PCT Pub. No.: WO2018/047821
PCT Pub. Date: Mar. 15, 2018

(65) Prior Publication Data
US 2019/0229339 A1 Jul. 25, 2019

(30) Foreign Application Priority Data
Sep. 6, 2016 (JP) .............................. JP2016-173418

(51) Int. Cl.
*H01M 4/62* (2006.01)
*H01M 10/0585* (2010.01)
*C08F 236/12* (2006.01)
*H01M 10/0562* (2010.01)

(52) U.S. Cl.
CPC ........... *H01M 4/622* (2013.01); *C08F 236/12* (2013.01); *H01M 4/62* (2013.01); *H01M 10/0562* (2013.01); *H01M 10/0585* (2013.01); *C08F 2800/20* (2013.01)

(58) Field of Classification Search
None
See application file for complete search history.

(56) References Cited

U.S. PATENT DOCUMENTS

| | | | | |
|---|---|---|---|---|
| 3,992,559 | A * | 11/1976 | Day | ........................ C08L 77/00 428/200 |
| 2014/0178756 | A1 | 6/2014 | Ishii et al. | |
| 2015/0050554 | A1 | 2/2015 | Fukumine et al. | |
| 2016/0028107 | A1 | 1/2016 | Kubo et al. | |
| 2016/0297955 | A1 | 10/2016 | Inoue et al. | |
| 2017/0101498 | A1* | 4/2017 | Tsukada | .................. C08C 19/02 |
| 2017/0110734 | A1 | 4/2017 | Tanaka | |
| 2018/0062162 | A1* | 3/2018 | Maeda | .............. H01M 10/4228 |
| 2018/0090764 | A1* | 3/2018 | Fukumine | ............... H01M 4/04 |
| 2018/0198127 | A1* | 7/2018 | Oguro | ..................... H01M 4/62 |
| 2020/0395616 | A1* | 12/2020 | Takahashi | ............. H01M 4/625 |
| 2021/0066720 | A1* | 3/2021 | Sonobe | ................. H01M 4/622 |

FOREIGN PATENT DOCUMENTS

| | | |
|---|---|---|
| CN | 105304863 A | 2/2016 |
| JP | S59151770 A | 8/1984 |
| JP | 4134617 B2 | 8/2008 |
| JP | 2009176484 A | 8/2009 |
| JP | 2009211950 A | 9/2009 |
| JP | 2013008485 A | 1/2013 |
| JP | 2014011002 A | 1/2014 |
| WO | 2013080989 A1 | 6/2013 |
| WO | 2015080130 A1 | 6/2015 |
| WO | 2015151529 A1 | 10/2015 |
| WO | 2016148304 A1 | 9/2016 |

OTHER PUBLICATIONS

Nov. 7, 2017, International Search Report issued in the International Patent Application No. PCT/JP2017/031964.
Dec. 17, 2019, the Extended European Search Report issued by the European Patent Office in the corresponding European Patent Application No. 17848761.7.
Mar. 12, 2019, International Preliminary Report on Patentability issued in the International Patent Application No. PCT/JP2017/031964.

* cited by examiner

*Primary Examiner* — Joseph D Anthony
(74) *Attorney, Agent, or Firm* — Kenja IP Law PC

(57) ABSTRACT

Provided is a binder composition for an all-solid-state battery with which an all-solid-state battery having excellent capacity characteristics can be obtained. The binder composition contains: a copolymer including an alkylene structural unit and a nitrile group-containing monomer unit; and an organic solvent having a boiling point of 100° C. or higher. The copolymer includes the nitrile group-containing monomer unit with a percentage content of at least 10 mass % and not more than 30 mass % and has an iodine value of at least 40 mg/100 mg and not more than 130 mg/100 mg.

4 Claims, No Drawings

BINDER COMPOSITION FOR ALL-SOLID-STATE BATTERY, SLURRY COMPOSITION FOR ALL-SOLID-STATE BATTERY, ELECTRODE FOR ALL-SOLID-STATE BATTERY, AND ALL-SOLID-STATE BATTERY

TECHNICAL FIELD

The present disclosure relates to a binder composition for an all-solid-state battery, a slurry composition for an all-solid-state battery, an electrode for an all-solid-state battery, and an all-solid-state battery.

BACKGROUND

Demand for batteries such as lithium ion batteries has been increasing in recent years for various applications such as mobile information terminals, mobile electronic devices, and other mobile terminals, and also domestic small power storage devices, electric motorcycles, electric vehicles, and hybrid electric vehicles.

The widespread use of batteries in such applications has been accompanied by demand for further improvement of battery safety. Examples of effective methods for ensuring battery safety include preventing leakage of organic electrolyte solution containing an electrolyte dissolved in an organic solvent. On the other hand, techniques for producing batteries that include a solid electrolyte layer instead of a flammable organic electrolyte solution and in which all battery members are in a solid form (all-solid-state batteries) have been investigated.

Specifically, an all-solid-state battery generally includes a solid electrolyte layer as an electrolyte layer between a positive electrode and a negative electrode. The solid electrolyte layer may, for example, be a polymeric solid electrolyte layer or an inorganic solid electrolyte layer. As one example of a polymeric solid electrolyte layer, PTL 1 describes a solid electrolyte layer that is formed through shaping of a composition obtained by adding an electrolyte salt to polyethylene oxide or the like. On the other hand, as one example of an inorganic solid electrolyte layer, PTL 2 describes a solid electrolyte layer obtained through press forming of a powder of a specific three-component glassy solid electrolyte. An all-solid-state battery including an inorganic solid electrolyte layer, in particular, is extremely safe compared to a battery in which an organic electrolyte solution is used. For reasons such as described above, the development of highly safe all-solid-state batteries including inorganic solid electrolyte layers has been progressing, particularly in recent years.

In production of an all-solid-state battery, it is normally the case that a binder is used. The binder may be used, for example, in a solid electrolyte layer or in an electrode active material layer of an electrode including the electrode active material layer on a current collector in order to bind components such as solid electrolyte particles and an electrode active material, and thereby prevent detachment of these components from a battery member such as an electrode.

PTL 3 and PTL 4 describe all-solid-state lithium secondary batteries in which a solid electrolyte layer is formed by a method (application method) in which a slurry composition for a solid electrolyte layer that contains solid electrolyte particles and a solvent is applied onto a positive electrode or a negative electrode, and is then dried. In an electrode or solid electrolyte layer obtained through application of a slurry composition and subsequent drying of solvent, a binder such as described above is an important factor in expression of characteristics as a battery.

CITATION LIST

Patent Literature

PTL 1: JP 4134617 B
PTL 2: JP S59-151770 A
PTL 3: JP 2009-176484 A
PTL 4: JP 2009-211950 A

SUMMARY

Technical Problem

Studies carried out by the inventors have revealed that there are cases in which the all-solid-state lithium secondary batteries described in PTL 3 and 4 have inadequate capacity characteristics as a result of insufficient ion conductivity within a solid electrolyte layer or within an electrode active material layer.

Accordingly, an objective of the present disclosure is to provide a binder composition for an all-solid-state battery, a slurry composition for an all-solid-state battery, and an electrode for an all-solid-state battery with which an all-solid-state battery having excellent capacity characteristics can be obtained, and also to provide an all-solid-state battery having excellent capacity characteristics.

Solution to Problem

As a result of diligent investigation, the inventors discovered that the objective set forth above can be achieved using a binder composition that contains a copolymer having a specific chemical composition and an iodine value within a specific range as a binder and that contains an organic solvent having a boiling point that is a specific temperature or higher as a solvent. In this manner, the inventors completed the present disclosure.

Specifically, the present disclosure provides the following.

[1] A binder composition for an all-solid-state battery comprising:
a copolymer including a nitrile group-containing monomer unit with a percentage content of at least 10 mass % and not more than 30 mass % and an alkylene structural unit, and having an iodine value of at least 40 mg/100 mg and not more than 130 mg/100 mg; and
an organic solvent having a boiling point of 100° C. or higher.

[2] The binder composition for an all-solid-state battery according to the foregoing [1], wherein the organic solvent having a boiling point of 100° C. or higher is at least one of xylene and toluene.

[3] A slurry composition for an all-solid-state battery comprising:
the binder composition for an all-solid-state battery according to the foregoing [1] or [2]; and
solid electrolyte particles.

[4] The slurry composition for an all-solid-state battery according to the foregoing [3], further comprising an electrode active material.

[5] An electrode for an all-solid-state battery comprising an electrode active material layer formed from the slurry composition for an all-solid-state battery according to the foregoing [4].

[6] An all-solid-state battery comprising the electrode for an all-solid-state battery according to the foregoing [5].

Advantageous Effect

According to the present disclosure, it is possible to provide a binder composition for an all-solid-state battery, a slurry composition for an all-solid-state battery, and an electrode for an all-solid-state battery with which an all-solid-state battery having excellent capacity characteristics can be obtained, and also to provide an all-solid-state battery having excellent capacity characteristics.

DETAILED DESCRIPTION

The following provides a detailed description of embodiments of the present disclosure.

A presently disclosed binder composition for an all-solid-state battery is used in production of an all-solid-state battery (for example, in formation of a solid electrolyte layer or in formation of an electrode active material layer of an electrode).

Binder Composition for All-Solid-State Battery

The presently disclosed binder composition for an all-solid-state battery contains: a copolymer including an alkylene structural unit and a nitrile group-containing monomer unit; and an organic solvent. The percentage content of the nitrile group-containing monomer unit in the copolymer is at least 10 mass % and not more than 30 mass %. Moreover, the copolymer has an iodine value of at least 40 mg/100 mg and not more than 130 mg/100 mg. Furthermore, the organic solvent has a boiling point of 100° C. or higher.

Copolymer

The copolymer used in the present disclosure includes an alkylene structural unit and a nitrile group-containing monomer unit as repeating units. The copolymer may optionally further include repeating units other than the alkylene structural unit and the nitrile group-containing monomer unit (hereinafter, also referred to as "other repeating units").

When a polymer is described as "including a monomer unit" in the present disclosure, this means that "a polymer obtained with the monomer includes a structural unit (repeating unit) derived from the monomer".

Alkylene Structural Unit

The alkylene structural unit is a repeating unit composed only of an alkylene structure represented by a general formula $—C_nH_{2n}—$ (n is an integer of 2 or more).

Although the alkylene structural unit may be linear or branched, the alkylene structural unit is preferably linear (i.e., is preferably a linear alkylene structural unit). The carbon number of the alkylene structural unit is preferably 4 or more (i.e., n in the preceding general formula is preferably 4 or more).

The method by which the alkylene structural unit is introduced into the copolymer is not specifically limited and may, for example, be either of the following methods (1) and (2).

(1) A method involving producing a polymer including a conjugated diene monomer unit from a monomer composition containing a conjugated diene monomer and hydrogenating the resultant polymer in order to convert the conjugated diene monomer unit to an alkylene structural unit (2) A method involving producing a copolymer from a monomer composition containing a 1-olefin monomer Of these methods, method (1) is preferable in terms of ease of production of the copolymer.

Examples of conjugated diene monomers that may be used in method (1) include conjugated diene compounds having a carbon number of 4 or more such as 1,3-butadiene, isoprene, 2,3-dimethyl-1,3-butadiene, and 1,3-pentadiene. Of these conjugated diene monomers, 1,3-butadiene is preferable. In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit). Selective hydrogenation of the conjugated diene monomer unit can be carried out by a water-layer hydrogenation method, for example.

Examples of 1-olefin monomers that may be used in method (2) include ethylene, propylene, 1-butene, and 1-hexene.

One of these conjugated diene monomers or 1-olefin monomers may be used individually, or two or more of these conjugated diene monomers or 1-olefin monomers may be used in combination.

The percentage content of the alkylene structural unit in the copolymer when all repeating units in the copolymer (total of structural units and monomer units) are taken to be 100 mass % is preferably 70 mass % or more, and more preferably 75 mass % or more, and is preferably 90 mass % or less, and more preferably 85 mass % or less. Peel strength (strength of adhesion of a solid electrolyte layer and/or electrode active material layer to another layer or member) tends to be insufficient if the percentage content of the alkylene structural unit in the copolymer is too low, whereas solubility in organic solvent decreases if the percentage content of the alkylene structural unit in the copolymer is too high.

The percentage content of the alkylene structural unit in the copolymer can be calculated from an area ratio of peaks in a spectrum obtained through $^1$H-NMR measurement.

Nitrile Group-Containing Monomer Unit

The nitrile group-containing monomer unit is a repeating unit that is derived from a nitrile group-containing monomer. The copolymer used in the present disclosure can display excellent flexibility and binding capacity as a result of including the nitrile group-containing monomer unit. Consequently, an all-solid-state battery produced using the presently disclosed binder composition for an all-solid-state battery has excellent peel strength and capacity characteristics.

Examples of nitrile group-containing monomers that may be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these monomers, acrylonitrile and methacrylonitrile are preferable, and acrylonitrile is more preferable as a nitrile group-containing monomer from a viewpoint of increasing binding capacity of the copolymer. One of these nitrile group-containing monomers may be used individually, or two or more of these nitrile group-containing monomers may be used in combination.

The percentage content of the nitrile group-containing monomer unit in the copolymer used in the present disclosure when all repeating units in the copolymer are taken to be 100 mass % is required to be at least 10 mass % and not more than 30 mass %, is preferably 15 mass % or more, more preferably 17 mass % or more, and even more preferably 20 mass % or more, and is preferably 25 mass % or less from a viewpoint of providing the copolymer with a suitable degree of affinity with a solid electrolyte and excellent dispersibility and binding capacity. Solubility of the copolymer in organic solvent becomes insufficient if the percentage content of the nitrile group-containing monomer unit in the copolymer is too high. Conversely, affinity of the copolymer with a solid electrolyte becomes insufficient and battery characteristics such as capacity characteristics deteriorate if the percentage content of the nitrile group-containing monomer in the copolymer is too low.

Other Repeating Units

No specific limitations are placed on other repeating units that may be included besides the alkylene structural unit and the nitrile group-containing monomer unit described above. Examples of such other repeating units include repeating units derived from known monomers that are copolymerizable with the monomers described above, such as a (meth) acrylic acid ester monomer unit, a hydrophilic group-containing monomer unit, and an aromatic vinyl monomer unit.

One of such monomers may be used individually, or two or more of such monomers may be used in combination. In the present disclosure, "(meth)acryl" is used to indicate "acryl" and/or "methacryl".

(Meth)Acrylic Acid Ester Monomer Unit

Examples of (meth)acrylic acid ester monomers that may be used to form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

The use of a (meth)acrylic acid ester monomer in production of the copolymer can improve affinity of the obtained copolymer with organic solvent and can thereby increase fluidity of a solid electrolyte-containing slurry composition.

Hydrophilic Group-Containing Monomer Unit

Examples of hydrophilic group-containing monomers that may be used to form the hydrophilic group-containing monomer unit include polymerizable monomers having a hydrophilic group. Specific examples of hydrophilic group-containing monomers include carboxy group-containing monomers, sulfo group-containing monomers, phosphate group-containing monomers, and hydroxy group-containing monomers.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of monocarboxylic acid derivatives include 2-ethylacrylic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and esters of polybasic carboxylic acids such as methyl allyl maleate, diphenyl maleate, nonyl maleate, decyl maleate, dodecyl maleate, octadecyl maleate, fluoroalkyl maleate, monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth) allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents a hydrogen atom or a methyl group); mono(meth) acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

Examples of aromatic vinyl monomers include styrene, α-methylstyrene, butoxystyrene, and vinylnaphthalene.

The percentage content of other repeating units in the copolymer used in the present disclosure when all repeating units in the copolymer are taken to be 100 mass % is preferably 40 mass % or less, more preferably 30 mass % or less, and even more preferably 20 mass % or less.

Iodine Value

The iodine value of the copolymer used in the present disclosure is required to be at least 40 mg/100 mg and not more than 130 mg/100 mg, is preferably 50 mg/100 mg or more, more preferably 60 mg/100 mg or more, and even more preferably 80 mg/100 mg or more, and is preferably 120 mg/100 mg or less from a viewpoint of providing a battery having excellent battery characteristics such as capacity characteristics. Peel strength decreases if the iodine value of the copolymer is too low. On the other hand, although initial capacity of an all-solid-state battery is good even if the iodine value of the copolymer is too high, there is a larger decrease in battery capacity upon roughly five cycles of charging and discharging.

The iodine value can be determined in accordance with JIS K6235:2006.

Production Method of Copolymer

No specific limitations are placed on the method by which the copolymer used in the present disclosure is produced. For example, the copolymer may be obtained by polymerizing a monomer composition containing the monomers set forth above. The polymerization may be carried out in the presence of an optional chain transfer agent (molecular weight modifier). Moreover, the obtained copolymer may be hydrogenated to adjust the iodine value of the copolymer.

Herein, the percentage content of each monomer in the monomer composition used to produce the copolymer can be set in accordance with the percentage content of each repeating unit in the copolymer.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

The following describes a case in which emulsion polymerization is adopted as the method of polymerization.

Emulsion Polymerization

The emulsion polymerization can be carried out by a standard method. Moreover, polymerization auxiliary materials that are typically used such as emulsifiers, polymerization initiators, and chain transfer agents may be used in the emulsion polymerization.

Any emulsifier may be used so long as the desired copolymer can be obtained and examples thereof include anionic surfactants, nonionic surfactants, cationic surfactants, and amphoteric surfactants. Of these emulsifiers, anionic surfactants such as alkylbenzene sulfonates, aliphatic sulfonates, higher alcohol sulfates, α-olefin sulfonates, and alkyl ether sulfates are preferable.

The amount of the emulsifier may be any amount so long as the desired copolymer can be obtained and, relative to 100 parts by mass, in total, of monomers in the monomer composition, is preferably 0.5 parts by mass or more, and more preferably 1 part by mass or more, and is preferably 10 parts by mass or less, and more preferably 5 parts by mass or less.

Any polymerization initiator may be used in the polymerization reaction so long as the desired copolymer can be obtained and examples thereof include sodium persulfate (NaPS), ammonium persulfate (APS), and potassium persulfate (KPS).

Moreover, a chain transfer agent may be included in the polymerization system during polymerization. Examples of chain transfer agents that may be used include alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; terpinolene; thiuram compounds such as tetramethylthiuram disulfide, tetraethylthiuram disulfide, and tetramethylthiuram monosulfide; phenolic compounds such as 2,6-di-t-butyl-4-methylphenol and styrenated phenol; allyl compounds such as allyl alcohol; halogenated hydrocarbon compounds such as dichloromethane, dibromomethane, and carbon tetrabromide; thioglycolic acid; thiomalic acid; 2-ethylhexyl thioglycolate; diphenylethylene; and α-methylstyrene dimer. Of these chain transfer agents, alkyl mercaptans are preferable, and t-dodecyl mercaptan is more preferable from a viewpoint of inhibiting side reactions. One of these chain transfer agents may be used individually, or two or more of these chain transfer agents may be used in combination in a freely selected ratio.

In a case in which a chain transfer agent is used, the amount of the chain transfer agent per 100 parts by mass, in total, of monomers in the monomer composition is preferably 0.1 parts by mass or more, and more preferably 0.15 parts by mass or more, and is preferably 0.6 parts by mass or less, and more preferably 0.5 parts by mass or less.

In the polymerization, seed particles may be used to perform seeded polymerization. The polymerization conditions may also be freely selected in accordance with the polymerization method, the type of polymerization initiator, and so forth.

Hydrogenation

In a case in which the copolymer is hydrogenated, the hydrogenation method of the copolymer is not specifically limited and is, for example, preferably a water-layer hydrogenation method described in WO 2013/080989 A1 and JP 2013-8485 A, and more preferably a water-layer direct hydrogenation method.

In the water-layer direct hydrogenation method, the concentration of unsaturated polymer in the water layer (concentration in dispersion liquid state) is preferably restricted to 40 mass % or less in order to prevent aggregation.

No specific limitations are placed on the hydrogenation catalyst that is used so long as it does not readily decompose in water. Specific examples of hydrogenation catalysts that may be used in the case of a palladium catalyst include palladium salts of carboxylic acids such as formic acid, propionic acid, lauric acid, succinic acid, oleic acid, and phthalic acid; chlorinated products of palladium such as palladium chloride, dichloro(cyclooctadiene)palladium, dichloro(norbornadiene)palladium, and ammonium hexachloropalladate(IV); and iodinated products of palladium such as palladium iodide; and palladium sulfate dihydrate. Of these examples, palladium salts of carboxylic acids, dichloro(norbornadiene)palladium, and ammonium hexachloropalladate(IV) are particularly preferable.

The amount of the hydrogenation catalyst that is used may be set as appropriate and, in terms of the amount of metal in the hydrogenation catalyst relative to the amount of unsaturated polymer that is to be hydrogenated, is preferably at least 5 ppm and not more than 6,000 ppm, and more preferably at least 10 ppm and not more than 4,000 ppm.

The reaction temperature in the water-layer direct hydrogenation method is preferably at least 0° C. and not higher than 300° C., more preferably at least 20° C. and not higher than 150° C., and particularly preferably at least 30° C. and not higher than 100° C. When the reaction temperature is within any of the ranges set forth above, it is possible to inhibit a phenomenon in which the rate of reaction decreases due to the reaction temperature being too low. Moreover, it is possible to inhibit a phenomenon in which side reactions such as a hydrogenation reaction of nitrile groups occur due to the reaction temperature being too high.

The hydrogen pressure is preferably at least 0.1 MPa and not more than 30 MPa, and more preferably at least 0.5 MPa and not more than 20 MPa. The reaction time is determined based on the reaction temperature, the hydrogen pressure, the targeted percentage hydrogenation (iodine value), and so forth.

In the water-layer direct hydrogenation method, the hydrogenation catalyst in the dispersion liquid is removed at the end of the reaction. The method by which the hydrogenation catalyst is removed may, for example, be a method in which an adsorbent such as activated carbon or an ion exchange resin is added, the hydrogenation catalyst is adsorbed by the adsorbent under stirring, and then the dispersion liquid is subjected to filtration or centrifugal separation.

Organic Solvent

The organic solvent used in the presently disclosed binder composition for an all-solid-state battery has a boiling point of 100° C. or higher. The boiling point referred to above is the boiling point under normal temperature and normal pressure. The organic solvent having a boiling point of 100° C. or higher is preferably an aromatic hydrocarbon such as toluene or xylene; an ether such as cyclopentyl methyl ether; or an ester such as butyl acetate, and is more preferably toluene or xylene. These organic solvents may be used individually or as a mixture of two or more types.

The boiling point of the organic solvent is required to be 100° C. or higher as described above, is preferably 105° C. or higher, and is preferably 250° C. or lower, more preferably 200° C. or lower, and even more preferably 160° C. or lower. If the boiling point of the organic solvent is lower than 100° C., process difficulty in solvent replacement increases, and the yield decreases. On the other hand, an organic solvent boiling point of 200° C. or lower enables efficient slurry composition drying.

Production Method of Binder Composition for All-Solid-State Battery

No specific limitations are placed on the method by which the presently disclosed binder composition for an all-solid-state battery is produced. The presently disclosed binder composition for an all-solid-state battery is preferably obtained by, for example, performing solvent exchange of water contained in the water dispersion of the copolymer described above with the organic solvent described above. The solvent exchange may be carried out by a commonly known method. For example, a rotary evaporator may be charged with the water dispersion, an ester compound and/or a carbonate compound, and an organic solvent, and then a solvent exchange and dehydration operation may be carried out under reduced pressure at a specific temperature.

All-Solid-State Battery

The copolymer contained in the presently disclosed binder composition for an all-solid-state battery set forth above can be used as a binder in at least one layer out of a positive electrode active material layer, a negative electrode active material layer, and a solid electrolyte layer of an all-solid-state battery, and is preferably used as a binder in all of these layers. More specifically, in production of an all-solid-state battery including a positive electrode that includes a positive electrode active material layer on a current collector, a negative electrode that includes a negative electrode active material layer on a current collector, and a solid electrolyte layer that is disposed between these positive and negative electrode active material layers, a slurry composition for an all-solid-state battery (slurry composition for solid electrolyte layer, slurry composition for positive electrode active material layer, or slurry composition for negative electrode active material layer) containing solid electrolyte particles and the presently disclosed binder composition for an all-solid-state battery may be used to form at least one layer out of the positive electrode active material layer, the negative electrode active material layer, and the solid electrolyte layer, and preferably to form all of these layers.

The following describes the solid electrolyte layer, the positive electrode active material layer, and the negative electrode active material layer.

Solid Electrolyte Layer

The solid electrolyte layer is formed by, for example, applying a slurry composition for a solid electrolyte layer containing solid electrolyte particles and a binder composition for a solid electrolyte layer onto the subsequently described positive electrode active material layer or negative electrode active material layer, and then drying the slurry composition.

Solid Electrolyte Particles

The solid electrolyte particles are normally in a particulate form as a result of having undergone pulverization, and have an indeterminate shape rather than a completely spherical shape. The size of fine particles is normally measured by a method in which the particles are irradiated with laser light and then scattered light is measured, for example. In this situation, the particle diameter is a value that presumes that the shape of a single particle is spherical. When multiple particles are measured together, the proportion of particles having a certain particle diameter can be expressed as a particle size distribution. Solid electrolyte particles forming a solid electrolyte layer are typically indicated by the average particle diameter through a value measured by this method.

The average particle diameter of the solid electrolyte particles is preferably at least 0.3 μm and not more than 1.3 μm from a viewpoint that a slurry composition for a solid electrolyte layer having good dispersibility and coatability can be obtained. Note that the average particle diameter of the solid electrolyte particles is the volume-average particle diameter and indicates a particle diameter (D50) that, in a particle size distribution (volume basis) measured by laser diffraction, is the particle diameter at which cumulative volume calculated from a small diameter end of the distribution reaches 50%.

No specific limitations are placed on the solid electrolyte particles other than being particles that are conductive with respect to a charge carrier (for example, a lithium ion). For example, in a case in which the all-solid-state battery in which the presently disclosed binder composition for an all-solid-state battery is used is an all-solid-state lithium secondary battery, the solid electrolyte particles preferably include a crystalline inorganic lithium ion conductor or an amorphous inorganic lithium ion conductor. One type of solid electrolyte particles may be used individually, or two or more types of solid electrolyte particles may be used in combination.

Examples of crystalline inorganic lithium ion conductors include $Li_3N$, LISICON ($Li_{14}Zn(GeO_4)_4$), perovskite-type $Li_{0.5}La_{0.5}TiO_3$, LIPON ($Li_{3+y}PO_{4-x}N_x$), and Thio-LISICON ($Li_{3.25}Ge_{0.25}P_{0.75}S_4$).

No specific limitations are placed on the amorphous inorganic lithium ion conductor so long as it contains S (sulfur atom) and exhibits ion conductivity (i.e., is a sulfide solid electrolyte material). In a case in which the all-solid-state battery in which the presently disclosed binder for an all-solid-state battery is to be used is an all-solid-state lithium secondary battery, a material obtained using a raw material composition containing $Li_2S$ and a sulfide of an element belonging to any of groups 13 to 15 may be used as the sulfide solid electrolyte material. The method by which the sulfide solid electrolyte material is synthesized using such a raw material composition may be an amorphization method, for example. Examples of amorphization methods that may be used include mechanical milling and melt quenching, of which, mechanical milling is preferable. This is because mechanical milling enables processing at normal temperature and simplification of the production process.

The element belonging to any of groups 13 to 15 may be Al, Si, Ge, P, As, Sb, or the like. Specific examples of sulfides of elements belonging to groups 13 to 15 include $Al_2S_3$, $SiS_2$, $GeS_2$, $P_2S_3$, $P_2S_5$, $As_2S_3$, and $Sb_2S_3$. Of these sulfides, the use of a sulfide of an element belonging to group 14 or 15 is preferable. In particular, the sulfide solid electrolyte material obtained using a raw material composition containing $Li_2S$ and a sulfide of an element belonging to any of groups 13 to 15 is preferably a $Li_2S$—$P_2S_5$ material, a $Li_2S$—$SiS_2$ material, a $Li_2S$—$GeS_2$ material, or a $Li_2S$—$Al_2S_3$ material, and is more preferably a $Li_2S$—$P_2S_5$ material. This is because these materials have excellent Li ion conductivity.

Moreover, the sulfide solid electrolyte material preferably includes bridging sulfur. The inclusion of bridging sulfur increases ion conductivity. When a sulfide solid electrolyte material includes bridging sulfur, reactivity with a positive electrode active material is normally high, and a high-resistance layer is more readily formed. However, as a result of the binder composition containing the copolymer including an alkylene structural unit and a nitrile group-containing monomer unit being used in the present disclosure, an effect of the present disclosure with regard to inhibiting high-resistance layer formation can be sufficiently displayed. The inclusion of bridging sulfur can be judged by considering, for example, measurement results of a Raman spectrum, the chemical composition ratio of raw material, measurement results of NMR, and the like.

The molar fraction of $Li_2S$ in a $Li_2S$—$P_2S_5$ material or a $Li_2S$—$Al_2S_3$ material is, for example, within a range of 50% to 74%, and preferably within a range of 60% to 74% from a viewpoint of more reliably obtaining a sulfide solid electrolyte material including bridging sulfur.

Moreover, the sulfide solid electrolyte material may be sulfide glass, or may be crystallized sulfide glass obtained through heat treatment of this sulfide glass. The sulfide glass can be obtained by the previously described amorphization methods, for example. The crystallized sulfide glass can be obtained by subjecting sulfide glass to heat treatment, for example.

In particular, the sulfide solid electrolyte material is preferably crystallized sulfide glass represented by $Li_7P_3S_{11}$. This is because this crystallized sulfide glass has particularly good Li ion conductivity. $Li_7P_3S_{11}$ can be synthesized by, for example, mixing $Li_2S$ and $P_2S_5$ in a molar ratio of 70:30, performing amorphization using a ball mill to synthesize sulfide glass, and subjecting the obtained sulfide glass to heat treatment at a temperature of at least 150° C. and not higher than 360° C. to synthesize the $Li_7P_3S_{11}$.

Binder Composition for Solid Electrolyte Layer

A binder for a solid electrolyte layer contained in the binder composition for a solid electrolyte layer is used in order to bind the solid electrolyte particles and form a solid electrolyte layer. It is preferable that the above-described copolymer including an alkylene structural unit and a nitrile group-containing monomer unit is used as the binder for a solid electrolyte layer. Moreover, it is preferable that the presently disclosed binder composition for an all-solid-state battery containing the copolymer and the organic solvent having a boiling point of 100° C. or higher is used as the binder composition for a solid electrolyte layer.

Positive Electrode Active Material Layer

The positive electrode active material layer is formed by, for example, applying a slurry composition for a positive electrode active material layer containing a positive electrode active material, solid electrolyte particles, and a binder composition for a positive electrode onto the surface of a subsequently described current collector, and then drying the slurry composition. The slurry composition for a positive electrode active material layer is produced by, for example, mixing the positive electrode active material, the solid electrolyte particles, the binder composition for a positive electrode, and other components that are added as necessary in the presence of an organic solvent.

Positive Electrode Active Material

In the case of an all-solid-state lithium secondary battery, for example, the positive electrode active material is a compound that can store and release lithium ions. Positive electrode active materials are broadly categorized as positive electrode active materials composed of inorganic compounds and positive electrode active materials composed of organic compounds.

Examples of positive electrode active materials composed of inorganic compounds include transition metal oxides, composite oxides of lithium and transition metals, and transition metal sulfides. The transition metal may be Fe, Co, Ni, Mn, or the like. Specific examples of inorganic compounds that may be used in the positive electrode active material include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

Examples of positive electrode active materials composed of organic compounds include polyaniline, polypyrrole, polyacenes, disulfide compounds, polysulfide compounds, and N-fluoropyridinium salts.

One positive electrode active material may be used individually, or two or more positive electrode active materials may be used in combination. For example, a mixture of an inorganic compound such as described above and an organic compound such as described above may be used as the positive electrode active material.

The average particle diameter of the positive electrode active material used in the present disclosure is normally at least 0.1 μm and not more than 50 μm, and preferably at least 1 μm and not more than 20 μm from a viewpoint of improving battery characteristics such as load characteristics and charge/discharge cycle characteristics, and from a viewpoint that an all-solid-state secondary battery having high charge/discharge capacity can be obtained, and handling of the slurry composition for a positive electrode active material layer and handling during positive electrode production are easy. Note that the average particle diameter of the positive electrode active material is the volume-average particle diameter and indicates a particle diameter (D50) that, in a particle size distribution (volume basis) measured by laser diffraction, is the particle diameter at which cumulative volume calculated from a small diameter end of the distribution reaches 50%.

Solid Electrolyte Particles

The solid electrolyte particles may be any of the solid electrolyte particles previously described as examples in the "Solid electrolyte layer" section.

The weight ratio of the positive electrode active material and the solid electrolyte particles (positive electrode active material: solid electrolyte particles) is preferably 90:10 to 30:70, and more preferably 80:20 to 40:60. When the weight ratio of the positive electrode active material and the solid electrolyte particles is within any of the ranges set forth above, it is possible to inhibit a phenomenon of battery capacity decreasing as a result of the amount of positive electrode active material in the battery decreasing due to the proportion constituted by the positive electrode active material being too small. Moreover, it is possible to inhibit a phenomenon of battery capacity decreasing as a result of electrical conductivity being insufficient and the positive electrode active material not being effectively used due to the proportion constituted by the solid electrolyte particles being too small.

Binder Composition for Positive Electrode

A binder for a positive electrode contained in the binder composition for a positive electrode is used in order to bind the positive electrode active material and the solid electrolyte particles and form a positive electrode active material layer. It is preferable that the above-described copolymer including an alkylene structural unit and a nitrile group-containing monomer unit is used as the binder for a positive electrode. Moreover, it is preferable that the presently disclosed binder composition for an all-solid-state battery containing the copolymer and the organic solvent having a boiling point of 100° C. or higher is used as the binder composition for a positive electrode.

No specific limitations are placed on the content of the binder for a positive electrode in the slurry composition for a positive electrode active material layer. However, from a viewpoint of preventing detachment of the positive electrode active material from the positive electrode without impairing battery reactions, the content of the binder for a positive electrode in terms of solid content per 100 parts by mass of the positive electrode active material is preferably at least 0.1 parts by mass and not more than 5 parts by mass, and more preferably at least 0.2 parts by mass and not more than 4 parts by mass.

Organic Solvent and Other Components

From a viewpoint of obtaining good coating characteristics while maintaining dispersibility of the solid electrolyte particles, the content of organic solvent in the slurry composition for a positive electrode active material layer per 100 parts by mass of the positive electrode active material is preferably at least 20 parts by mass and not more than 80 parts by mass, and more preferably at least 30 parts by mass and not more than 70 parts by mass. The organic solvent in the slurry composition for a positive electrode active material layer may be composed of just organic solvent that was contained in the binder composition for a positive electrode. Alternatively, organic solvent may be separately added as necessary in production of the slurry composition for a positive electrode active material layer.

Examples of components other than those described above that may be added to the slurry composition for a positive electrode active material layer as necessary include additives exhibiting various functions such as conductive agents and reinforcing materials. No specific limitations are placed on these other components so long as they do not influence battery reactions.

Conductive Agent

The conductive agent may be any material that can impart electrical conductivity and typical examples thereof include carbon powder such as acetylene black, carbon black, and graphite, and fibers and foils of various metals. One of these conductive agents may be used individually, or two or more of these conductive agents may be used in combination.

Reinforcing Material

Various inorganic fillers and organic fillers having a spherical, plate-like, rod-like, or fibrous form can be used as reinforcing materials. One of these reinforcing materials may be used individually, or two or more of these reinforcing materials may be used in combination.

Negative Electrode Active Material Layer

The negative electrode active material layer is a layer containing at least a negative electrode active material.

Negative Electrode Active Material

Examples of negative electrode active materials that may be used include carbon allotropes such as graphite and coke. A negative electrode active material containing a carbon allotrope may be used in a mixed or coated form with a metal, a metal salt, an oxide, or the like. Other examples of negative electrode active materials that may be used include oxides of silicon, tin, zinc, manganese, iron, nickel, and the like, sulfuric acid salts, lithium metal, lithium alloys such as Li—Al, Li—Bi—Cd, and Li—Sn—Cd, lithium transition metal nitrides, and silicon. In the case of a metal material, the metal material may be used as an electrode in the form of a metal foil or metal plate, or may be used in a particulate form.

In a situation in which the negative electrode active material is in a particulate form, the negative electrode active material layer is formed by, for example, applying a slurry composition for a negative electrode active material layer containing the negative electrode active material, solid electrolyte particles, and a binder composition for a negative electrode onto the surface of a subsequently described current collector, and then drying the slurry composition. The slurry composition for a negative electrode active material layer is produced by, for example, mixing the negative electrode active material, the solid electrolyte particles, the binder composition for a negative electrode, and other components that are added as necessary in the presence of an organic solvent.

In the case of a particulate negative electrode active material, the average particle diameter of the negative electrode active material is normally at least 1 μm and not more than 50 μm, and preferably at least 15 μm and not more than 30 μm from a viewpoint of improving battery characteristics such as initial efficiency, load characteristics, and charge/discharge cycle characteristics. Note that the average particle diameter of the negative electrode active material is the volume-average particle diameter and indicates a particle diameter (D50) that, in a particle size distribution (volume basis) measured by laser diffraction, is the particle diameter at which cumulative volume calculated from a small diameter end of the distribution reaches 50%.

Solid Electrolyte Particles

The solid electrolyte particles may be any of the solid electrolyte particles previously described as examples in the "Solid electrolyte layer" section.

The weight ratio of the negative electrode active material and the solid electrolyte particles (negative electrode active material: solid electrolyte particles) is preferably 90:10 to 50:50, and more preferably 60:40 to 80:20. When the weight ratio of the negative electrode active material and the solid electrolyte particles is within any of the ranges set forth above, it is possible to inhibit a phenomenon of battery capacity decreasing as a result of the amount of negative electrode active material in the battery decreasing due to the proportion constituted by the negative electrode active material being too small. Moreover, it is possible to inhibit a phenomenon of battery capacity decreasing as a result of electrical conductivity being insufficient and the negative electrode active material not being effectively used due to the proportion constituted by the solid electrolyte particles being too small.

Binder Composition for Negative Electrode

A binder for a negative electrode contained in the binder composition for a negative electrode is used in order to bind the negative electrode active material and the solid electrolyte particles and form a negative electrode active material layer. It is preferable that the above-described copolymer including an alkylene structural unit and a nitrile group-containing monomer unit is used as the binder for a negative electrode. Moreover, it is preferable that the presently disclosed binder composition for an all-solid-state battery containing the copolymer and the organic solvent having a boiling point of 100° C. or higher is used as the binder composition for a negative electrode.

No specific limitations are placed on the content of the binder for a negative electrode in the slurry composition for a negative electrode active material layer in a case in which the negative electrode active material is in a particulate form. However, from a viewpoint of preventing detachment of the negative electrode active material from the negative electrode without impairing battery reactions, the content of the binder for a negative electrode in terms of solid content per 100 parts by mass of the negative electrode active material is preferably at least 0.1 parts by mass and not more than 5 parts by mass, and more preferably at least 0.2 parts by mass and not more than 4 parts by mass.

Organic Solvent and Other Components

From a viewpoint of obtaining good coating characteristics while maintaining dispersibility of the solid electrolyte particles, the content of organic solvent in the slurry composition for a negative electrode active material layer per 100 parts by mass of the negative electrode active material is preferably at least 20 parts by mass and not more than 80 parts by mass, and more preferably at least 30 parts by mass and not more than 70 parts by mass. The organic solvent in the slurry composition for a negative electrode active material layer may be composed of just organic solvent that was contained in the binder composition for a negative electrode. Alternatively, organic solvent may be separately added as necessary in production of the slurry composition for a negative electrode active material layer.

The other components that are added to the slurry composition for a negative electrode active material layer as necessary may be any of the other components previously described as examples in the "Positive electrode active material layer" section.

Current Collector

The current collector used in formation of the positive electrode active material layer or negative electrode active material layer may be any material that has electrical conductivity and electrochemical durability. However, the current collector is preferably a metal material such as iron, copper, aluminum, nickel, stainless steel, titanium, tantalum, gold, or platinum from a viewpoint of having heat resistance. Of these metal materials, aluminum is particularly preferable for a positive electrode and copper is particularly preferable for a negative electrode.

Although no specific limitations are placed on the shape of the current collector, the current collector is preferably a sheet-shaped current collector having a thickness of approximately 0.001 mm to 0.5 mm.

The current collector is preferably subjected to surface roughening treatment before use in order to increase adhesion strength with the positive electrode active material layer or negative electrode active material layer set forth above. The method of surface roughening may, for example, be a mechanical polishing method, an electrolytic polishing method, or a chemical polishing method. The mechanical polishing is performed, for example, using a coated abrasive in which abrasive grains are bonded to cloth or paper, a whetstone, an emery wheel, or a wire brush including steel wire or the like. An intermediate layer may be formed on the surface of the current collector in order to increase electrical conductivity or adhesion strength of the current collector with the positive electrode active material layer or negative electrode active material layer.

Production of Slurry Composition for Solid Electrolyte Layer

The slurry composition for a solid electrolyte layer is obtained by, for example, mixing the above-described solid electrolyte particles, binder composition for a solid electrolyte layer, and other components that are added as necessary in the presence of an organic solvent.

Production of Slurry Composition for Positive Electrode Active Material Layer The slurry composition for a positive electrode active material layer is obtained by, for example, mixing the above-described positive electrode active material, solid electrolyte particles, binder composition for a positive electrode, and other components that are added as necessary in the presence of an organic solvent.

Production of Slurry Composition for Negative Electrode Active Material Layer The slurry composition for a negative electrode active material layer is obtained by, for example, mixing the above-described negative electrode active material, solid electrolyte particles, binder composition for a negative electrode, and other components that are added as necessary in the presence of an organic solvent.

No specific limitations are placed on the mixing method in production of each of the above-described slurry compositions (slurry composition for solid electrolyte layer, slurry composition for positive electrode active material layer, and slurry composition for negative electrode active material layer), and a method using a mixing apparatus such as a stirring-type apparatus, a shaking-type apparatus, or a rotary-type apparatus may be adopted. Moreover, examples include a method in which a dispersing and kneading apparatus such as a homogenizer, a ball mill, a bead mill, a planetary mixer, a sand mill, a roll mill, or a planetary kneader is used. A method in which a planetary mixer, a ball mill, or a bead mill is used is preferable from a viewpoint that this method can inhibit aggregation of the solid electrolyte particles.

Production of All-Solid-State Battery

The positive electrode of the all-solid-state battery is obtained by forming a positive electrode active material layer on a current collector. The positive electrode active material layer is formed by, for example, applying the above-described slurry composition for a positive electrode active material layer onto a current collector, and then drying the slurry composition.

In a case in which a metal foil or a metal plate is used as a negative electrode active material, the metal foil or metal plate may be used as the negative electrode of the all-solid-state battery in this form. On the other hand, in a case in which the negative electrode active material is in a particulate form, the negative electrode is obtained by forming a negative electrode active material layer on a separate current collector to the current collector of the positive electrode. The negative electrode active material layer is formed by applying the above-described slurry composition for a negative electrode active material layer onto a separate current collector to the current collector of the positive electrode, and then drying the slurry composition.

Next, a solid electrolyte layer is formed by, for example, applying the slurry composition for a solid electrolyte layer onto the positive electrode active material layer or negative electrode active material layer that has been formed, and then drying the slurry composition. The electrode on which the solid electrolyte layer is not formed and the electrode on which the solid electrolyte layer is formed are then laminated to produce an all-solid-state battery device.

No specific limitations are placed on the method by which the slurry composition for a positive electrode active material layer and the slurry composition for a negative electrode active material layer are each applied onto a current collector, and this application may be carried out by, for example, doctor blading, dip coating, reverse roll coating, direct roll coating, gravure coating, extrusion coating, brush coating, or the like. Although no specific limitations are placed on the amount of slurry composition that is applied, the amount is normally set such that the thickness of the active material layer formed after removal of organic solvent is at least 5 μm and not more than 300 μm, and preferably at least 10 μm and not more than 250 μm. The drying method is not specifically limited and examples of drying methods that may be used include drying by warm, hot, or low-humidity air, drying in a vacuum, and drying through irradiation with (far) infrared radiation, an electron beam, or the like. The drying conditions are normally adjusted such that the organic solvent is volatilized as quickly as possible within a rate range for which cracks do not form in the electrode active material layer due to stress concentration and for which peeling of the electrode active material layer from the current collector does not occur. Moreover, an electrode that is obtained after this drying may be pressed in order to stabilize the electrode. Examples of pressing methods that may be used include mold pressing and calender pressing, but these examples are not limiting.

The drying temperature is set as a temperature at which sufficient volatilization of the organic solvent occurs. Specifically, the drying temperature is preferably at least 50° C. and not higher than 250° C., and more preferably at least 80° C. and not higher than 200° C. from a viewpoint that a good electrode active material layer can be formed without thermal decomposition of the binder for a positive electrode or the binder for a negative electrode. The drying time is normally within a range of 10 minutes to 60 minutes but is not specifically limited to this range.

No specific limitations are placed on the method by which the slurry composition for a solid electrolyte layer is applied onto the positive electrode active material layer or the negative electrode active material layer. For example, the slurry composition for a solid electrolyte layer may be applied by any of the methods by which the slurry composition for a positive electrode active material layer and the slurry composition for a negative electrode active material layer can be applied onto a current collector, but gravure coating is preferable from a viewpoint that this enables formation of the solid electrolyte layer as a thin film. Although no specific limitations are placed on the amount of slurry composition that is applied, the amount is normally set such that the thickness of the solid electrolyte layer formed after removal of organic solvent is at least 2 µm and not more than 20 µm, and preferably at least 3 µm and not more than 15 µm. The drying method, drying conditions, and drying temperature may be the same as those of the slurry composition for a positive electrode active material layer and the slurry composition for a negative electrode active material layer.

Moreover, a laminate obtained by laminating the electrode on which the solid electrolyte layer is formed and the electrode on which the solid electrolyte layer is not formed may be subjected to pressing. The method of pressing is not specifically limited and may be flat plate pressing, roll pressing, cold isostatic pressing (CIP), or the like. The pressing pressure is preferably at least 5 MPa and not more than 700 MPa, and more preferably at least 7 MPa and not more than 500 MPa from a viewpoint of lowering resistance at each interface between the electrodes and the solid electrolyte layer, lowering contact resistance between particles in each of the layers, and achieving good battery characteristics.

Although no specific limitations are placed on whether the slurry composition for a solid electrolyte layer is applied onto the positive electrode active material layer or the negative electrode active material layer, it is preferable that the slurry composition for a solid electrolyte layer is applied onto whichever of the active material layers has an electrode active material with a larger particle diameter used therein. This is because depressions and protrusions are formed at the surface of an electrode active material layer when an electrode active material having a large particle diameter is used therein, and these depressions and protrusions at the electrode active material layer surface can be smoothed through application of the slurry composition. As a result, the contact area between the solid electrolyte layer and the electrodes is increased when the electrode on which the solid electrolyte layer is formed and the electrode on which the solid electrolyte layer is not formed are laminated, and this suppresses interface resistance.

The obtained all-solid-state battery device is placed in a battery container either as obtained or after rolling, folding, or the like in accordance with the battery shape. The battery container is subsequently sealed to obtain an all-solid-state battery. Moreover, an expanded metal, an overcurrent preventing device such as a fuse or a PTC device, a lead plate, or the like may be placed in the battery container as necessary in order to prevent pressure increase inside the battery and the occurrence of overcharging or overdischarging. The battery shape may be a coin type, a button type, a sheet type, a cylinder type, a prismatic type, a flat type, or the like.

EXAMPLES

The following describes the present disclosure through examples. However, the present disclosure is not in any way limited by these examples. Various characteristics were evaluated by the following methods. Note that "parts" and "%" in the examples refer to "parts by mass" and "mass %", respectively, unless otherwise specified.

Measurement of Iodine Value

An iodine value was determined in accordance with JIS K6235:2006.

Percentage Content of Hydrogenated 1,3-butadiene Unit (Alkylene Structural Unit)

The percentage content of hydrogenated 1,3-butadiene in a copolymer was calculated from an area ratio of peaks in a spectrum obtained through $^1$H-NMR measurement.

Solvent Replacement

A water dispersion of a copolymer obtained in each example or comparative example was subjected to solvent exchange with xylene (boiling point: 139° C.; same applies below). An evaluation of "A" was made in a case in which the copolymer could be dispersed in the xylene, whereas an evaluation of "B" was made in a case in which aggregates formed. The results are shown in Table 1.

Peel Strength

A slurry composition for a positive electrode active material layer used in each example or comparative example was applied onto aluminum foil and was dried for 10 minutes at 80° C. to prepare a specimen. The specimen was subjected to a 90° peeling test at a peeling speed of 30 mm/min using tape of 18 mm in width. The maximum value for peel strength after the start of the peeling test was recorded as the peel strength (N/18 mm). The results are shown in Table 1. A larger value for the peel strength indicates stronger adhesion of a positive electrode active material layer to aluminum foil. For example, a value of 5 N/18 mm or more can be said to indicate good peel strength.

Measurement of Resistance

The resistance of a solid electrolyte layer produced in each example or comparative example was determined by measurement using an impedance meter and calculation of resistance (Ω) from a Nyquist plot. The results are shown in Table 1. A smaller value for the resistance of the solid electrolyte layer indicates that an all-solid-state battery having better battery performance is obtained.

Battery Capacity

An all-solid-state secondary battery produced in each example or comparative example was subjected to charge/discharge cycling of constant-current charging to 4.2 V and subsequent constant-voltage charging by a 0.5 C constant-current constant-voltage charging method at 25° C., followed by discharging to 3.0 V by a 0.5 C constant current at 25° C. Five charge/discharge cycles were performed. The discharge capacity of the fifth cycle is shown in Table 1 as the battery capacity (mAh). A larger value indicates better capacity characteristics.

Example 1

Production of Copolymer Including Alkylene Structural Unit and Nitrile Group-Containing Monomer Unit An autoclave equipped with a stirrer was charged with 240 parts of deionized water, 2.5 parts of sodium alkylbenzene sulfonate as an emulsifier, 20 parts of acrylonitrile as a nitrile group-containing monomer, and 0.25 parts of t-dodecyl mercaptan as a chain transfer agent in this order, and the inside of the autoclave was purged with nitrogen. Thereafter, 80 parts of 1,3-butadiene was fed into the autoclave under pressure as a conjugated diene monomer, 0.25 parts of ammonium persulfate was added as a polymerization initiator, and a polymerization reaction was carried out at a reaction temperature of 40° C. Through this reaction, a copolymer of acrylonitrile and 1,3-butadiene was obtained. The polymerization conversion rate was 94%.

Deionized water was added to the resultant copolymer to obtain a solution adjusted to a total solid content concentration of 12%. An autoclave of 1 L in capacity equipped with a stirrer was charged with 400 mL of the resultant solution (total solid content: 48 g), and nitrogen gas was passed through the solution for 10 minutes to remove dissolved oxygen present in the solution. Thereafter, 45 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. under pressurization to 3 MPa with hydrogen gas to perform a hydrogenation reaction for 6 hours.

Thereafter, the contents of the autoclave were returned to normal temperature and the system was converted to a nitrogen atmosphere. An evaporator was subsequently used to concentrate the contents to a solid content concentration of 40% and yield a water dispersion of a copolymer including an alkylene structural unit and a nitrile group-containing monomer unit. The resultant copolymer had an iodine value of 45 mg/100 mg.

Production of Binder Composition for All-Solid-State Battery

A binder composition containing the copolymer including an alkylene structural unit and a nitrile group-containing monomer unit and xylene was obtained by adding 500 parts of xylene to 250 parts of the obtained water dispersion of the copolymer including an alkylene structural unit and a nitrile group-containing monomer unit, and then evaporating water under reduced pressure.

Production of Slurry Composition for Positive Electrode Active Material Layer

A mixture of 100 parts of lithium cobalt oxide (volume-average particle diameter: 11.5 μm) as a positive electrode active material, 150 parts of sulfide glass composed of $Li_2S$ and $P_2S_5$ ($Li_2S/P_2S_5$=70 mol %/30 mol %; volume-average particle diameter: 0.4 μm) as solid electrolyte particles, 13 parts of acetylene black as a conductive agent, and 2 parts in terms of solid content of the binder composition obtained as described above was prepared. The mixture was adjusted to a solid content concentration of 78% through addition of xylene as an organic solvent and was then mixed for 60 minutes using a planetary mixer. The solid content concentration was further adjusted to 74% with xylene, and then 10 minutes of mixing was performed to yield a slurry composition for a positive electrode active material layer.

Production of Slurry Composition for Negative Electrode Active Material Layer

A mixture of 100 parts of graphite (volume-average particle diameter: 20 μm) as a negative electrode active material, 50 parts of sulfide glass composed of $Li_2S$ and $P_2S_5$ ($Li_2S/P_2S_5$=70 mol %/30 mol %; volume-average particle diameter: 0.4 μm) as solid electrolyte particles, and 2 parts in terms of solid content of the binder composition obtained as described above was prepared. The mixture was adjusted to a solid content concentration of 60% through addition of xylene as an organic solvent and was then mixed using a planetary mixer to yield a slurry composition for a negative electrode active material layer.

Production of Slurry Composition for Solid Electrolyte Layer

A mixture of 100 parts of sulfide glass composed of $Li_2S$ and $P_2S_5$ ($Li_2S/P_2S_5$=70 mol %/30 mol %; volume-average particle diameter: 1.2 μm; D90 particle diameter: 2.1 μm) as solid electrolyte particles and 2 parts in terms of solid content of the binder composition obtained as described above was prepared. The mixture was adjusted to a solid content concentration of 30% through addition of xylene as an organic solvent and was then mixed using a planetary mixer to yield a slurry composition for a solid electrolyte layer.

Production of All-Solid-State Secondary Battery

The slurry composition for a positive electrode active material layer was applied onto the surface of a current collector (aluminum foil) and was dried (110° C., 20 minutes) to form a positive electrode active material layer of 50 μm in thickness, and thereby produce a positive electrode. In addition, the slurry composition for a negative electrode active material layer was applied onto the surface of a separate current collector (copper foil) and was dried (110° C., 20 minutes) to form a negative electrode active material layer of 30 μm in thickness, and thereby produce a negative electrode.

Next, the slurry composition for a solid electrolyte layer was applied onto the surface of the positive electrode active material layer and was dried (110° C., 10 minutes) to form a solid electrolyte layer of 18 μm in thickness, and thereby obtain a solid electrolyte layer-equipped positive electrode for an all-solid-state secondary battery.

The solid electrolyte layer of the solid electrolyte layer-equipped positive electrode for an all-solid-state secondary battery and the negative electrode active material layer of the negative electrode were laminated, and then pressing was performed to obtain an all-solid-state secondary battery. The thickness of the solid electrolyte layer in the post-pressing all-solid-state secondary battery was 11 μm.

Example 2

A copolymer including an alkylene structural unit and a nitrile group-containing monomer unit was produced in the same way as in Example 1 with the exception that monomers used in production of the copolymer were changed to 28 parts of acrylonitrile and 72 parts of 1,3-butadiene. The resultant copolymer had an iodine value of 80 mg/100 mg.

Production of a binder composition for an all-solid-state battery and production of an all-solid-state secondary battery were carried out in the same way as in Example 1 with the exception that this copolymer was used.

Example 3

A copolymer including an alkylene structural unit and a nitrile group-containing monomer unit was produced in the same way as in Example 1 with the exception that monomers used in production of the copolymer were changed to 24 parts of acrylonitrile, 71 parts of 1,3-butadiene, and 5 parts of butyl acrylate. The resultant copolymer had an iodine value of 85 mg/100 mg.

Production of a binder composition for an all-solid-state battery and production of an all-solid-state secondary battery were carried out in the same way as in Example 1 with the exception that this copolymer was used.

Example 4

A copolymer including an alkylene structural unit and a nitrile group-containing monomer unit was produced in the same way as in Example 1 with the exception that monomers used in production of the copolymer were changed to 15 parts of acrylonitrile, 75 parts of 1,3-butadiene, and 10 parts of butyl acrylate. The resultant copolymer had an iodine value of 60 mg/100 mg.

Production of a binder composition for an all-solid-state battery and production of an all-solid-state secondary battery were carried out in the same way as in Example 1 with the exception that this copolymer was used.

Comparative Example 1

A copolymer including an alkylene structural unit and a nitrile group-containing monomer unit was produced in the same way as in Example 1 with the exception that the hydrogenation reaction time in production of the copolymer was changed to 2 hours. The resultant copolymer had an iodine value of 200 mg/100 mg.

Production of a binder composition for an all-solid-state battery and production of an all-solid-state secondary battery were carried out in the same way as in Example 1 with the exception that this copolymer was used.

Comparative Example 2

A copolymer including an alkylene structural unit and a nitrile group-containing monomer unit was produced in the same way as in Example 1 with the exception that the hydrogenation reaction time in production of the copolymer was changed to 20 hours. The resultant copolymer had an iodine value of 13 mg/100 mg.

Production of a binder composition for an all-solid-state battery and production of an all-solid-state secondary battery were carried out in the same way as in Example 1 with the exception that this copolymer was used.

Comparative Example 3

A copolymer including an alkylene structural unit and a nitrile group-containing monomer unit was produced in the same way as in Example 1 with the exception that monomers used in production of the copolymer were changed to 40 parts of acrylonitrile and 60 parts of 1,3-butadiene. The resultant copolymer had an iodine value of 30 mg/100 mg.

Aggregates formed when a water dispersion of the copolymer was subjected to solvent exchange to xylene in the same way as in Example 1. Therefore, production of an all-solid-state secondary battery was not carried out.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Copolymer | Used monomers (mass %) | Acrylonitrile | 20 | 28 | 24 | 15 | 20 | 20 | 40 |
| | | 1,3-Butadiene | 80 | 72 | 71 | 75 | 80 | 80 | 60 |
| | | Butyl acrylate | — | — | 5 | 10 | — | — | — |
| | Percentage content of hydrogenated 1,3-butadiene unit (mass %) | | 78 | 70 | 70 | 73 | 8 | 78 | 38 |
| | Iodine value (mg/100 mg) | | 45 | 80 | 85 | 60 | 200 | 13 | 30 |
| Evaluations | Solvent replacement | | A | A | A | A | A | A | B |
| | Peel strength (N/18 mm) | | 6.6 | 8.5 | 8.8 | 7.5 | 11.3 | 3.8 | — |
| | Resistance (Ω) | | 3.5 | 4.5 | 5.5 | 4.4 | 25 | 25 | — |
| | Battery capacity (mAh) | | 18 | 18 | 16 | 15 | 2.2 | 5.8 | — |

It can be seen from Table 1 that in Examples 1 to 4 in which the used binder composition for an all-solid-state battery contained: a copolymer including a nitrile group-containing monomer unit with a percentage content of at least 10 mass % and not more than 30 mass % and an alkylene structural unit, and having an iodine value of at least 40 mg/100 mg and not more than 130 mg/100 mg; and an organic solvent having a boiling point of 100° C. or higher, the obtained positive electrode active material layer had excellent peel strength. Moreover, in Examples 1 to 4, the obtained solid electrolyte layer had low resistance, and battery capacity of the all-solid-state secondary battery upon five cycles of charging and discharging was good.

INDUSTRIAL APPLICABILITY

According to the present disclosure, it is possible to provide a binder composition for an all-solid-state battery, a slurry composition for an all-solid-state battery, and an electrode for an all-solid-state battery with which an all-solid-state battery having excellent capacity characteristics can be obtained, and also to provide an all-solid-state battery having excellent capacity characteristics.

The invention claimed is:

1. A binder composition for an all-solid-state battery comprising:
    a copolymer including a nitrile group-containing monomer unit with a percentage content of at least 10 mass % and not more than 30 mass % and an alkylene structural unit, and having an iodine value of at least 80 mg/100 mg and not more than 130 mg/100 mg; and
    an organic solvent having a boiling point of 100° C. or higher.
2. The binder composition for an all-solid-state battery according to claim 1, wherein the organic solvent having a boiling point of 100° C. or higher is at least one of xylene and toluene.

3. A slurry composition for an all-solid-state battery comprising:
   the binder composition for an all-solid-state battery according to claim 1; and
   solid electrolyte particles.

4. The slurry composition for an all-solid-state battery according to claim 3, further comprising an electrode active material.

\* \* \* \* \*